(12) United States Patent
Martin et al.

(10) Patent No.: US 8,909,229 B2
(45) Date of Patent: *Dec. 9, 2014

(54) FAST RESELECTION BETWEEN DIFFERENT RADIO ACCESS TECHNOLOGY NETWORKS

(75) Inventors: Brian Alexander Martin, Farnham Surrey (GB); Christopher Peter Callender, Fleet (GB); Stuart Ian Geary, Fleet (GB); Alexander Graham Charles, Fleet (GB); Steven Franklin, Guildford (GB); James Howard Tooley, London (GB)

(73) Assignee: Broadcom Corporation, Irvine, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/524,592

(22) Filed: Jun. 15, 2012

(65) Prior Publication Data
US 2012/0320879 A1 Dec. 20, 2012

Related U.S. Application Data

(63) Continuation of application No. 13/078,124, filed on Apr. 1, 2011, now abandoned, and a continuation of application No. 13/417,515, filed on Mar. 12, 2012.

(30) Foreign Application Priority Data

Apr. 1, 2011 (GB) .................................. 1105590.2
Mar. 9, 2012 (GB) .................................. 1204230.5

(51) Int. Cl.
*H04Q 7/20* (2006.01)

(52) U.S. Cl.
USPC ........... 455/436; 455/525; 455/434; 455/444; 455/440; 455/448; 370/331; 370/332; 370/335; 375/137

(58) Field of Classification Search
USPC ......... 455/436, 525, 434, 444, 542, 437, 438, 455/513, 511, 552.1, 115.2; 370/331, 332, 370/335, 336, 230, 329; 375/137, 260
See application file for complete search history.

(56) References Cited

U.S. PATENT DOCUMENTS

2004/0037241 A1* 2/2004 Kim et al. ...................... 370/329
2007/0004445 A1 1/2007 Dorsey et al. ................. 455/525
(Continued)

FOREIGN PATENT DOCUMENTS

EP 1467586 A2 10/2004
EP 1 594 327 A1 11/2005
(Continued)

OTHER PUBLICATIONS

Renesas Mobile Europe Ltd et al, Inter-RAT UMTS to LTE Reselection, published May 3, 2011, 3GPP Draft; R4-112967. 3rd Generation Partnership Project (3GPP), Mobile Competence Centre, 650 route des Lucioles, France.

(Continued)

*Primary Examiner* — Ajit Patel
*Assistant Examiner* — Fred Casca
(74) *Attorney, Agent, or Firm* — Stanton IP Law

(57) ABSTRACT

A user equipment UE determines that a neighbor cell is higher priority than a serving cell, measures neighbor cell signal strength in n>1 iterations, and analyzes them for reselecting from the serving cell to the neighbor cell. Each measurement iteration is spaced from one another by a time interval (e.g., 1 DRX) that is specific for the neighbor cell being higher priority. In various embodiments, the UE measures while in a Cell-PCH, URA-PCH or idle state/mode and the first iteration is taken at the first available measurement opportunity after transitioning to that state/mode. The UE reselects to the neighbor cell based on the analyzed signal strengths; in one embodiment the decision to reselect is without regard to signal quality of the serving cell; and in another the decision is without regard to whether a reselection condition remains satisfied for a specified time period $T_{reselection}$.

10 Claims, 3 Drawing Sheets

(56) References Cited

U.S. PATENT DOCUMENTS

| | | | |
|---|---|---|---|
| 2007/0129017 A1 | 6/2007 | Dalsgaard et al. | 455/67.11 |
| 2007/0270148 A1 | 11/2007 | Yeh et al. | 455/436 |
| 2008/0268843 A1 | 10/2008 | Ore et al. | 455/435.3 |
| 2008/0287127 A1 | 11/2008 | Wu et al. | 455/434 |
| 2009/0047958 A1* | 2/2009 | Rimhagen et al. | 455/436 |
| 2009/0088160 A1 | 4/2009 | Pani et al. | 455/436 |
| 2009/0124249 A1* | 5/2009 | Young et al. | 455/422.1 |
| 2009/0239535 A1* | 9/2009 | Chun et al. | 455/435.2 |
| 2009/0303891 A1 | 12/2009 | Lucas et al. | 370/252 |
| 2010/0255849 A1 | 10/2010 | Ore | 455/450 |
| 2010/0330921 A1 | 12/2010 | Kim et al. | 455/67.11 |

FOREIGN PATENT DOCUMENTS

| | | |
|---|---|---|
| EP | 1 971 176 A2 | 3/2008 |
| EP | 2 077 690 A2 | 7/2009 |
| EP | 2 262 309 A1 | 12/2010 |
| WO | WO-2008/072912 A1 | 6/2008 |
| WO | WO 2009/097481 A1 | 8/2009 |

OTHER PUBLICATIONS

Renesas Mobile Europe Ltd et al, Reselection from UTRAN CELL_FACH state to EUTRAN, published Apr. 4, 2011, 3GPP Draft; R2-112164. 3rd Generation Partnership Project (3GPP), Mobile Competence Centre, 650 route des Lucioles, France.

"3$^{rd}$ Generation Partnership Project; Technical Specification Group Radio Access Network; User Equipment (UE) procedures in idle mode and procedures for cell reselection in connected mode (Release 9)", 3GPP TS 25.304 V9.3.0, Sep. 2010, 50 pgs.

"3$^{rd}$ Generation Partnership Project; Technical Specification Group Radio Access Network; Requirements for support of radio resource management (FDD) (Release 10)", 3GPP TS 25.133 V10.0.0, Section 4.2.2.5a, Dec. 2010, 15 pgs.

* cited by examiner

FAST RESELECTION BETWEEN DIFFERENT RADIO ACCESS TECHNOLOGY NETWORKS

CROSS REFERENCE TO RELATED APPLICATIONS

This patent application is a continuation application under 35 USC §120 and 37 CFR 1.53(b) of co-pending U.S. patent application Ser. No. 13/417,515 (filed Mar. 12, 2012) and of co-pending U.S. application Ser. No. 13/078,124 (filed Apr. 1, 2011), and also claims priority under 35 U.S.C. 119(a) and 37 CFR 1.55 from UK Patent Application Serial No. GB 1204230.5 (filed Mar. 9, 2012) which is a divisional of UK Patent Application Serial No. GB1105590.2 (filed Apr. 1, 2011).

TECHNICAL FIELD

The exemplary and non-limiting embodiments of this invention relate generally to wireless communication systems, methods, devices and computer programs and, more specifically, relate to state transitions of a user equipment to take measurement reports for the purpose of reselecting between different priority cells.

BACKGROUND

The following abbreviations that may be found in the specification and/or the drawing figures are defined as follows:

3GPP third generation partnership project
DL downlink
DCH dedicated channel
DRX discontinuous reception
E-UTRAN evolved UTRAN (also termed LTE)
FACH forward access channel
GERAN GSM-enhanced data rates for global evolution (EDGE)
GSM global system for mobile communications
HSPA high speed packet access
LTE long term evolution
PCH paging channel
RAT radio access technology
RRC radio resource control
TDD time division duplex
UE user equipment
UMTS universal mobile telecommunications system
UL uplink
URA user registration area
UTRA UMTS terrestrial radio access
UTRAN UTRA network
WCDMA wideband code division multiple access The exemplary embodiments detailed herein are in the context of the UTRAN (e.g., WCDMA, HSPA, and GERAN) wireless systems by which a UE attached to a UTRAN cell via a FACH or DCH (the CELL-FACH and CELL-DCH states respectively) seeks to transition and attach to another higher priority cell (e.g., an inter-RAT E-UTRAN/LTE cell or an inter-frequency UTRAN cell operating on a higher priority frequency layer). These systems are exemplary only and these teachings are not limited only to those wireless systems but are more generally applicable.

There is intentionally no specification in LTE Release 8 for detailing how a UE in the CELL-FACH state may reselect to the LTE system since at the time it was assumed that such a UE could transition to the idle/cell-PCH/URA-PCH state to make the reselection. Since then a problem has been identified (i.e., in 3GPP RAN2#73 and RAN4#58 meetings) in which a UE may not be in an idle/Cell-PCH/URA-PCH state long enough to measure, analyze, and reselect from UTRAN to a higher priority E-UTRAN cell (e.g. LTE hotspots). Specifically, reselection from the UTRAN CELL-FACH state when under certain network configured state transition timers (e.g., the timer used for transitioning from CELL-FACH to URA-PCH) and traffic patterns, combined with the specified UE measuring rules, may make it impossible in certain circumstances for a UE to ever complete a reselection to an E-UTRAN cell. These conditions arise when the traffic pattern is "bursty" (e.g., when the UE is a packet switched oriented device used for always online type services, such as a combined UMTS/LTE USB (universal serial bus) modem which can be connected to a laptop).

One possible solution discussed was to enable reselection to an LTE cell while the UE was in the CELL-FACH state. This may not be universally suitable; it is a network equipment choice whether to use measurement occasions in the CELL-FACH state even if the same network operator deploys LTE cells in the same geographic area as its UTRAN cells.

It is therefore desirable to also have solutions for the UE to use when making frequent transitions between UTRAN CELL-FACH and CELL-PCH or URA-PCH states which are not dependent on the UTRAN's ability to configure and accept a UE's measurements in the CELL-FACH state.

In the current specification, the UE is required to perform the following steps:

a. Stop monitoring LTE neighbor cells when moving from Idle or PCH states to CELL-FACH state.

b. Start monitoring LTE neighbor cells when leaving CELL-FACH state to Idle or PCH states. The combination of steps a) and b) implies the UE needs to re-start its measurement evaluation and discard measurements taken before moving to the CELL-FACH state when it starts a new measurement after leaving the CELL-FACH state.

c. Measure high priority frequency layers at least every 60 s per configured higher priority frequency layer. This implies some UEs may wait 60 seconds per configured higher priority frequency layer before making a measurement after entering idle or PCH states.

d. Measure high priority (LTE) frequency layers at minimum each $K_{carrier}*T_{measure,EUTRA}$. For a typical 1.28 DRX cycle this is 6.4 seconds if one E-UTRA higher priority carrier is configured.

e. Measure and average at least 2 samples before making the reselection decision, and these measurements must be separated by at least $(K_{carrier}*T_{measure,EUTRA})/2$. Even if one assumes the UE takes its first measurement immediately after moving out of the CELL-FACH state, at least 2.5*DRX cycles will pass before a decision can be made and reselection can be performed. Typically this will be at least 3.84 seconds total for a 1.28 s DRX cycle. Taking into account that it is undesirable for battery life for the UE to wake up during the DRX cycle, the earliest time to transition to an LTE neighbor cell is 3 DRX cycles after the UE moves out of the Cell-FACH state.

f. Apply $T_{reselection}$ before moving to the new cell. $T_{reselection}$ is a delay imposed so the UE can check that the serving cell does not recover from giving bad coverage before the UE completes the reselection, and also allows the UE to check that the neighbor/new cell remains best ranked. This check deliberately adds additional delay to the reselection.

g. If, after detecting a cell in a higher priority search, it is determined that reselection has not occurred then the UE is not required to continuously measure the detected cell to evaluate the ongoing possibility of reselection and may wait for 60 s per configured higher priority frequency layer before evaluating the frequency again.

Co-owned U.S. patent application Ser. No. 13/023,675 entitled PRIORITY MEASUREMENT RULES FOR CHANNEL MEASUREMENT OCCASIONS (filed Feb. 9, 2011) details the use of measurement occasions in the CELL-FACH state to enable reselection. The solution detailed by the exemplary embodiments herein is even more universally adoptable since it is anticipated to be operable for all network configurations/timer settings.

SUMMARY

In a first exemplary embodiment of the invention there is an apparatus comprising a processing system that comprises at least one processor and a memory storing a set of computer instructions. In this embodiment the processing system is arranged to: determine that a neighbor cell is a higher priority cell than a serving cell; measure signal strength received from the neighbor cell in n iterations each spaced from one another by a time interval specific for the case in which the neighbor cell is the higher priority cell, in which n is an integer greater than one; and analyze the n measured signal strengths for reselecting a user equipment from the serving cell to the neighbor cell.

In a second exemplary embodiment of the invention there is a method comprising: determining that a neighbor cell is a higher priority cell than a serving cell; measuring signal strength received from the neighbor cell in n iterations each spaced from one another by a time interval specific for the case in which the neighbor cell is the higher priority cell, in which n is an integer greater than one; and analyzing the n measured signal strengths for reselecting a user equipment from the serving cell to the neighbor cell.

In a third exemplary embodiment of the invention there is a computer readable memory storing a set of instructions which, when executed by an apparatus, cause the apparatus to: determine that a neighbor cell is a higher priority cell than a serving cell; measure signal strength received from the neighbor cell in n iterations each spaced from one another by a time interval specific for the case in which the neighbor cell is the higher priority cell, in which n is an integer greater than one; and analyze the n measured signal strengths for reselecting a user equipment from the serving cell to the neighbor cell.

These and other embodiments and aspects are detailed below with particularity.

DETAILED DESCRIPTION

There are several RRC states in UTRA. The CELL-DCH state is characterized by a dedicated physical channel being allocated to the UE in uplink and downlink, the UE has a current active set given by the UTRAN cell, and the UE is able to use various transport channels such as dedicated transport channels and, in the UMTS TDD mode the UE can also use UL and DL shared transport channels. The CELL-FACH state is characterized by there being no dedicated physical channel allocated to the UE but instead the UE continuously monitors the FACH in the DL. In the CELL-FACH state the UE is assigned a common (default) or shared transport channel in the UL (RACH) which it can use for accessing a transport channel, and a UE in the UMTS TDD mode may additionally access one or more UL and DL shared channels. These may be considered more active states since the UE must monitor active channels more frequently than in the CELL-PCH or URA-PCH states detailed below.

The CELL-PCH state is characterized in that there is no dedicated physical channel allocated to the UE but instead the UE monitors for a page on the PCH, using a DRX to allow it to go into a power save mode when not listening to the PCH. It follows that no UL activity is possible in the CELL-PCH state. The URA-PCH state is similar, except instead of the cell itself tracking the UE's location from its last update in the Cell-FACH state the network tracks the UE location in the URA-PCH state only to the granularity of a UTRAN registration area (the UE makes URA updates while in the CELL-FACH state). These are of course less active from the UE's perspective than the CELL-DCH and the CELL-FACH states.

According to embodiments of these teachings to be detailed below, the UE operating in a UTRAN cell will change its RRC state from CELL-FACH or CELL-DCH (as the case may be) to CELL-PCH, URA-PCH or idle mode and collect measurements of a neighbor cell for reselection purposes. How those measurements are collected is detailed below with particularity.

Figure 1:
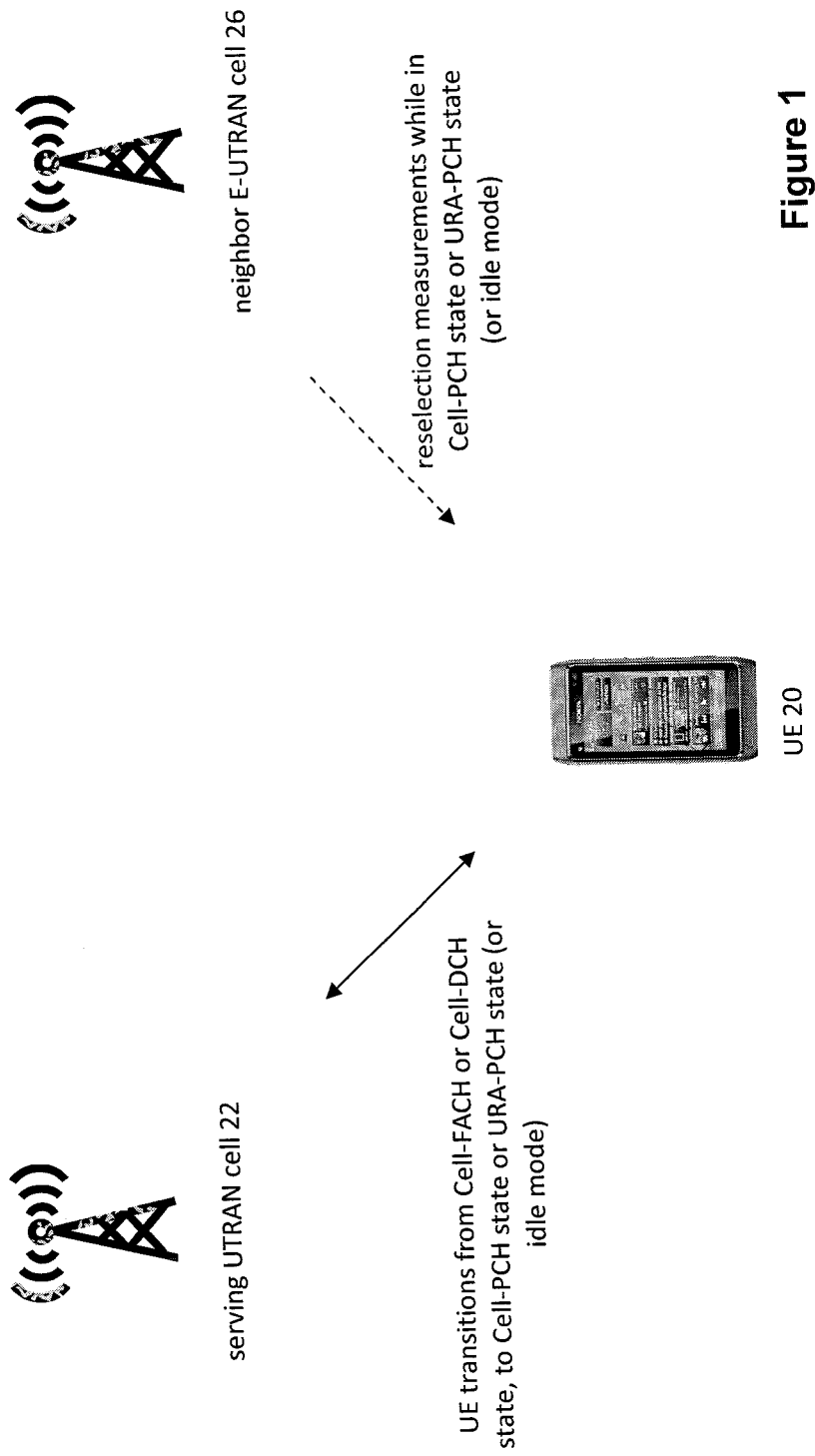
FIG. 1 is a schematic diagram of an exemplary environment in which embodiments of the invention may be practiced, a mobile device/UE under a UTRAN serving cell taking measurements for transitioning to an E-UTRAN neighbor cell.

FIG. 1 is a schematic diagram of a mobile device/UE 20 under a UTRAN serving cell 22. The UE 20 begins in a CELL-FACH or CELL-DCH state and transitions to either the CELL-PCH or URA-PCH state or idle mode/state. After transitioning to one of those states/modes the UE 20 measures the signal received from an E-UTRAN neighbor cell 26, and the UE 20 will then base its decision whether or not to reselect to the E-UTRAN cell 26 at least in part on the UE's analysis of those measurements. But the UE 20 is still under the serving UTRAN cell 22 and so must take measurements only at times when it is assured the serving UTRAN cell 22 will not send a transmission to it. As compared to the CELL-FACH and CELL-DCH states, the UE 20 has more opportunities to measure the neighbor cell 26 when it is only monitoring the PCH of the serving cell 22, hence the UE will first need to transition its RRC state from CELL-FACH or CELL-DCH to either CELL-PCH, URA-PCH or idle.

In the CELL-PCH state, URA-PCH state or idle mode the times at which the UE 20 need not 'listen' to the serving cell are governed in part by the DRX period which the UTRAN cell 22 assigns to the UE 20. In order to properly evaluate whether a neighbor cell 26 is appropriate for reselection, the UE 20 must obtain enough measurements to accurately reflect the radio conditions it can expect from the neighbor cell so that if indeed the UE 20 does reselect to it the UE will be able to maintain the channel(s). These measurements must be obtained quickly enough so that they remain valid in the face of possibly fading channel conditions. These measurements which the UE 20 takes of the neighbor cell 26 are by example received signal strength, or more particularly received signal power.

Exemplary embodiments of these teachings enable the UE 20 to make a fast reselection decision by allowing a shorter time interval between the measurements it obtains from the neighbor cell. For example, if the UE 20 having a UTRAN serving cell 22 is performing measurements on a neighbor cell which is an E-UTRAN cell 26 (or some other cell that is considered higher priority than the serving cell) then the UE 20 will use the shorter time interval between the measurements it takes on that E-UTRAN neighbor cell 26. But if instead that same UE 20 is taking measurements on a UTRAN neighbor cell (or some other cell that is not considered higher priority than the serving cell) then the UE 20 will use a longer time interval between those measurements.

The UE 20 can readily determine which neighbor cell is UTRAN and which is E-UTRAN along with corresponding priorities from the neighbor cell list broadcast in system information by the serving cell or informed to the UE by dedicated signalling, the neighbor cells' own broadcast system information or even from the frequency bands on which the neighbor cells transmit. The neighbor cell list may inform on what frequencies the neighbor cells operate; these are the frequency layers which the UE 20 measures for handover/reselection purposes. In an embodiment the UE 20 determines from that neighbor cell list which neighbor cells are operating on which RAT and which carriers are higher or lower priority than the serving frequency.

Generally, more recently specified RATs are configured as higher priority over older RATs since it is typical that the newer RAT will enable a higher data rate and/or more services than the older RAT. It is likely that E-UTRAN offers higher data rates and or more services than UTRAN. So in an embodiment the higher priority cell may be defined by the radio access technology it employs relative to that used by the serving cell.

According to a specific embodiment there are three distinct actions which the UE 20 takes for collecting and analyzing measurement reports for the purpose of reselecting to a higher priority cell. First, when a UE transitions its RRC state from the CELL-FACH or CELL-DCH state to the CELL-PCH state, URA-PCH state or Idle mode, the UE 20 will immediately upon making that RRC state change attempt to take a measurement of higher priority (e.g., LTE) frequency layers on the UE's first available measurement opportunity. The immediate measurement is needed because the time the UE is in an idle state may be limited. To mandate this behavior across UEs from different manufacturers will likely require that it be stipulated in a published specification. Taking the first measurement immediately after changing RRC state aids in making the whole reselection decision faster.

Second and as mentioned above, there are different intervals between when the UE 20 takes its neighbor cell measurements, depending on whether or not the neighbor cell 26 being measured is higher priority than the serving cell 22. In one non-limiting embodiment, once the UE determines that the neighbor cell 26 is an E-UTRAN or other higher priority cell, the UE 20 in the CELL-PCH state, URA-PCH state or Idle mode shall take measurements separated by a shorter time, such as for example one DRX cycle. The time interval is shorter as compared to if the neighbor cell were a UTRAN cell or a cell having the same or lower priority than the serving cell. This allows the UE 20 to average its measurement results and make the evaluation fast for reselection to a higher priority inter-RAT neighbor cell. Averaging multiple measurements assures robustness for the short term channel fading.

In current E-UTRAN specifications there is a value $T_{measure\_EUTRA}$ which gives a minimum measurement rate, but this minimum is the same as for the UTRAN cells and so it seems that these requirements from 3GPP TS 25.133 are the same for LTE as for GSM. The inventors recall that at the time these portions of the specification were drafted the goal was to conserve UE battery power by having a low minimum measurement rate. The inventors consider this appropriate for lower priority cells which need to be measured continuously in certain circumstances, but not necessarily so for higher priority cells. Specifically, the current rule set forth in 3GPP TS 25.133 v10.0.0 (2010-12) at section 4.2.2.5a is:

The UE shall measure RSRP at least every $K_{carrier}*T_{measure,EUTRA}$ as defined in table 4.2 for identified E-UTRA cells.

The UE shall filter RSRP measurements of each measured E-UTRA cell using at least 2 measurements. Within the set of measurements used for the filtering, at least two measurements shall be spaced by at least $(K_{carrier}*T_{measure,EUTRA})/2$.

For robustness of the reselection decision the UE should take multiple measurements before determining to reselect to the neighbor cell. Therefore the number of measurement iterations for a given neighbor cell shall be n iterations, in which n is an integer greater than one. The total time over which these n iterations for making a reselection evaluation are repeated is defined by the time period $T_{higher\_priority\_search}$, but the interval between each iteration of measuring depends on whether or not the neighbor cell being measured is higher priority than the serving cell. This maximizes the chance of performing the required two samples for higher priority frequencies and RATs before the RRC state changes, while not affecting the power consumption of measurements of lower priority frequencies and RATs.

In an embodiment this may be implemented by publication in a specification stipulating that the different (fast) measurement evaluation rules apply conditionally for high priority layers. By example, a new table in RAN4 specifications may be added to give the time intervals applicable only for reselection decisions concerning high priority E-UTRA cells.

The third action the UE takes according to this exemplary embodiment is to ignore the parameter $T_{reselection}$ when deciding whether to reselect to a higher priority cell or frequency layer, so long as the UE has been able to average at least n=2 measurement samples for its analysis of the higher priority neighbor cell. $T_{reselection}$ is a network configurable time period in E-UTRAN specifications during which the UE is to check that the reselection condition continues to be met, to assure it's not been triggered by from a temporary fade. By example, the reselection condition may be signal strength of the serving cell falling below a threshold. Averaging as few as two measurement samples should give enough confidence of the target/neighbor high priority cell when considering channel fading conditions. The serving cell quality is irrelevant in service based reselections (i.e., where the UE 20 seeks to attach to an E-UTRAN hot spot to access enhanced services but still remaining attached to the same UTRAN serving cell for basic cellular coverage).

This third action may also in an embodiment be mandated by a published standard to change the current UE directives. In one embodiment the UE can ignore checking signal strength/quality/power of the serving cell after its measurements and before reselecting to high priority frequency layers/cells. In an alternative embodiment the UE may be allowed to (or required to) ignore checking whether its original reselection condition or trigger remains satisfied after a specified time period $T_{reselection}$ when deciding to reselect to higher priority layers/cells.

Consolidating these three actions would then result in one specific but non-limiting embodiment in which the UE transitions from CELL-FACH to IDLE/PCH state, then performing an immediate measurement of high priority EUTRAN frequency layers. After one paging period has elapsed the UE will perform a second measurement of high priority EUTRAN frequency layers. The UE then analyzes those measurements so that if both measurements confirm a suitable E-UTRAN high priority candidate then ignore the $T_{reselection}$ timer and perform immediate reselection to the identified candidate.

Certain exemplary embodiments as detailed above provide the technical effect of ensuring that the UE is very likely to evaluate and reselect to high priority LTE frequency layers even with the most challenging of data traffic patterns and network configurations. An additional technical effect is that the UE could reselect within two DRX cycles after transitioning to a semi-idle state (CELL-PCH or URA-PCH) or to the idle mode, so unless the UE is paged on the very first paging occasion after the state transition it will always reselect (assuming the measurement reports verify the neighbor cell is strong enough). As a result of the above, the user experience is improved as hotspot locations can be found even during "always online" data sessions. Another technical effect is that power consumption is not affected if the UE remains in an idle/semi-idle mode, since the UE may then wait the same length of time ($T_{higher\_priority\_search}$) until it performs the next higher priority search, and the total number of measurement samples taken for each search is unchanged.

Additionally, implementation is seen to be quite straightforward since no new network configuration is needed and so no network upgrade is necessary. Further, there is little if any issue of interoperability since implementation is within the UE itself.

Figure 2:
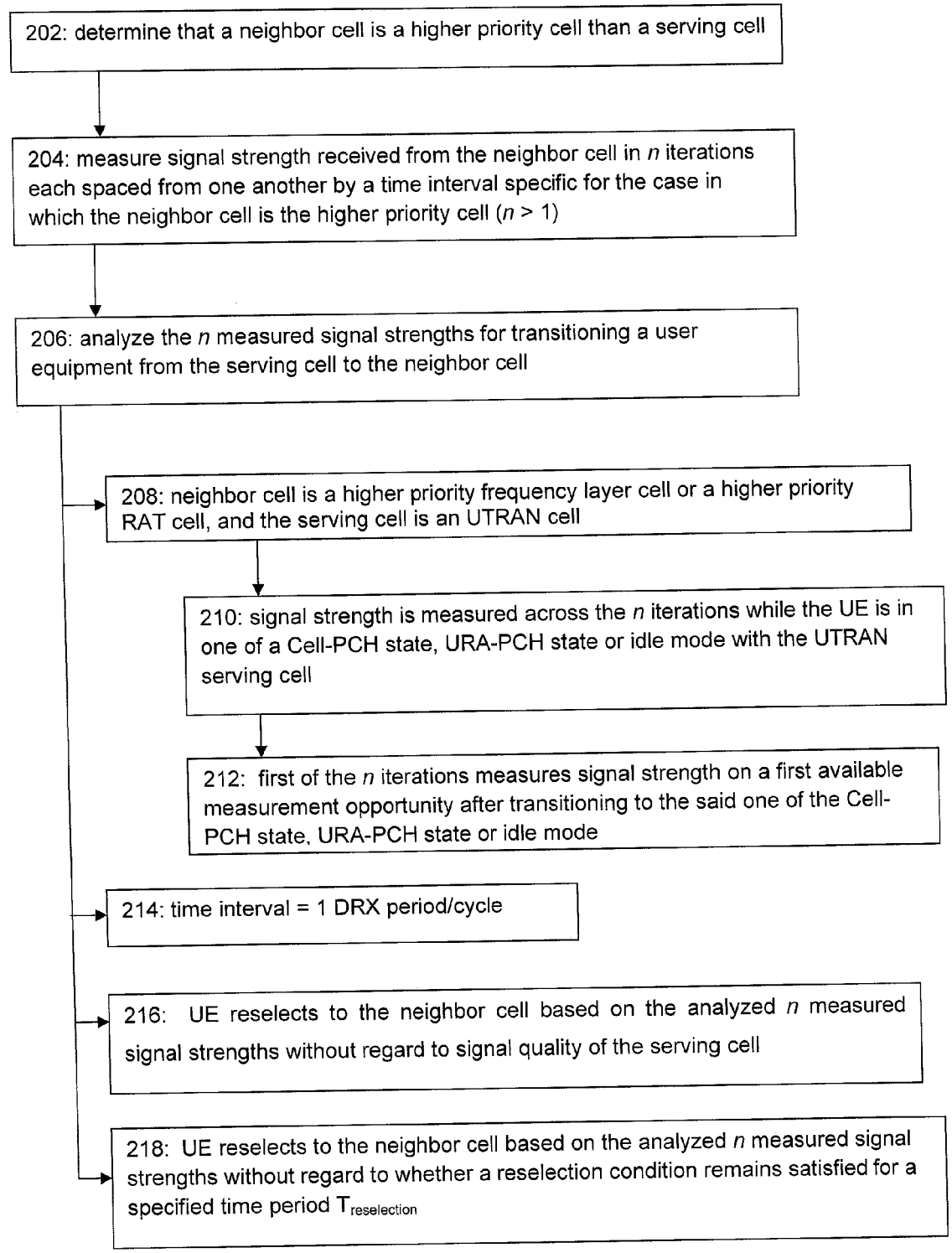
FIG. 2 is a logic flow diagram that illustrates the operation of a method, and a result of execution of computer program instructions embodied on a computer readable memory, in accordance with the exemplary embodiments of this invention.

FIG. 2 is a logic flow diagram which describes an exemplary embodiment of the invention from the perspective of the UE. FIG. 2 may be considered to illustrate the operation of a method, and a result of execution of a computer program stored in a computer readable memory, and a specific manner in which components of an electronic device/UE are configured to cause that electronic device to operate. The various blocks shown in FIG. 2 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 202 the UE or component(s) thereof determines that a neighbor cell is a higher priority cell than a serving cell. At block 204, the UE or component thereof measures signal strength received from the neighbor cell in n iterations, each spaced from one another by a time interval specific for the case in which the neighbor cell is the higher priority cell. As noted above n is an integer greater than one. Then at block 206 the UE or component(s) thereof analyze the n measured signal strengths for the purpose of reselecting the UE from the serving cell to the neighbor cell. By example this analysis includes averaging the n iterations of the measured signal strengths.

The remainder of FIG. 2 illustrates more specific implementations for blocks 202, 204 and 206. Block 208 stipulates that the neighbor cell is a higher priority frequency layer cell (e.g., a UTRAN cell operating on higher priority frequency layers than the serving cell) or a higher priority RAT cell (e.g., an E-UTRAN cell), and the serving cell is an UTRAN cell. That is, the neighbor cell may be an E-UTRAN cell or even a GSM cell which the operator has configured for higher priority frequency layers. Block 210 further details block 208 in that the signal strength of block 204 is measured across the n iterations while the user equipment is in one of a Cell-PCH state, URA-PCH state or idle mode with the UTRAN serving cell. Block 212 further narrows block 212 in that a first one of the n iterations measures signal strength on a first available measurement opportunity after the UE transitions to the Cell-PCH state, URA-PCH state or idle mode.

Block 214 gives the exemplary time interval between the higher priority measurement iterations, one DRX period which the UE utilizes with the serving cell. Block 216 details the embodiment in which the UE reselects from the serving cell to the neighbor cell based on the analyzed n measured signal strengths, without regard to signal quality of the serving cell which as noted above is one example of a reselection condition. And block 218 gives an alternative embodiment to block 216, in which the UE reselects from the serving cell to the neighbor cell based on the analyzed n measured signal strengths without regard to whether a reselection condition remains satisfied for a specified time period $T_{reselection}$.

In a specific embodiment, FIG. 6 may be considered to represent actions of a modem which may be apart from or disposed within the above UE.

Embodiments of the invention may be implemented as an apparatus which has determining means and measuring means and analyzing means. The determining means is for determining that a neighbor cell is a higher priority cell than a serving cell as in block 202 of FIG. 2, and may by example be a processor in conjunction with computer instructions stored in a computer readable memory and also in conjunction with a radio receiver. The measuring means is for measuring signal strength received from the neighbor cell in n iterations spaced by the priority-specific interval, as shown at block 204 of FIG. 2. Specific embodiments of such measuring means may be the above noted radio receiver. And there may also be analyzing means for analyzing the n measured signal strengths for reselecting a UE from the serving cell to the neighbor cell as detailed at block 206 of FIG. 2, such analyzing means by example also being the processor (one or more processors).

Figure 3:
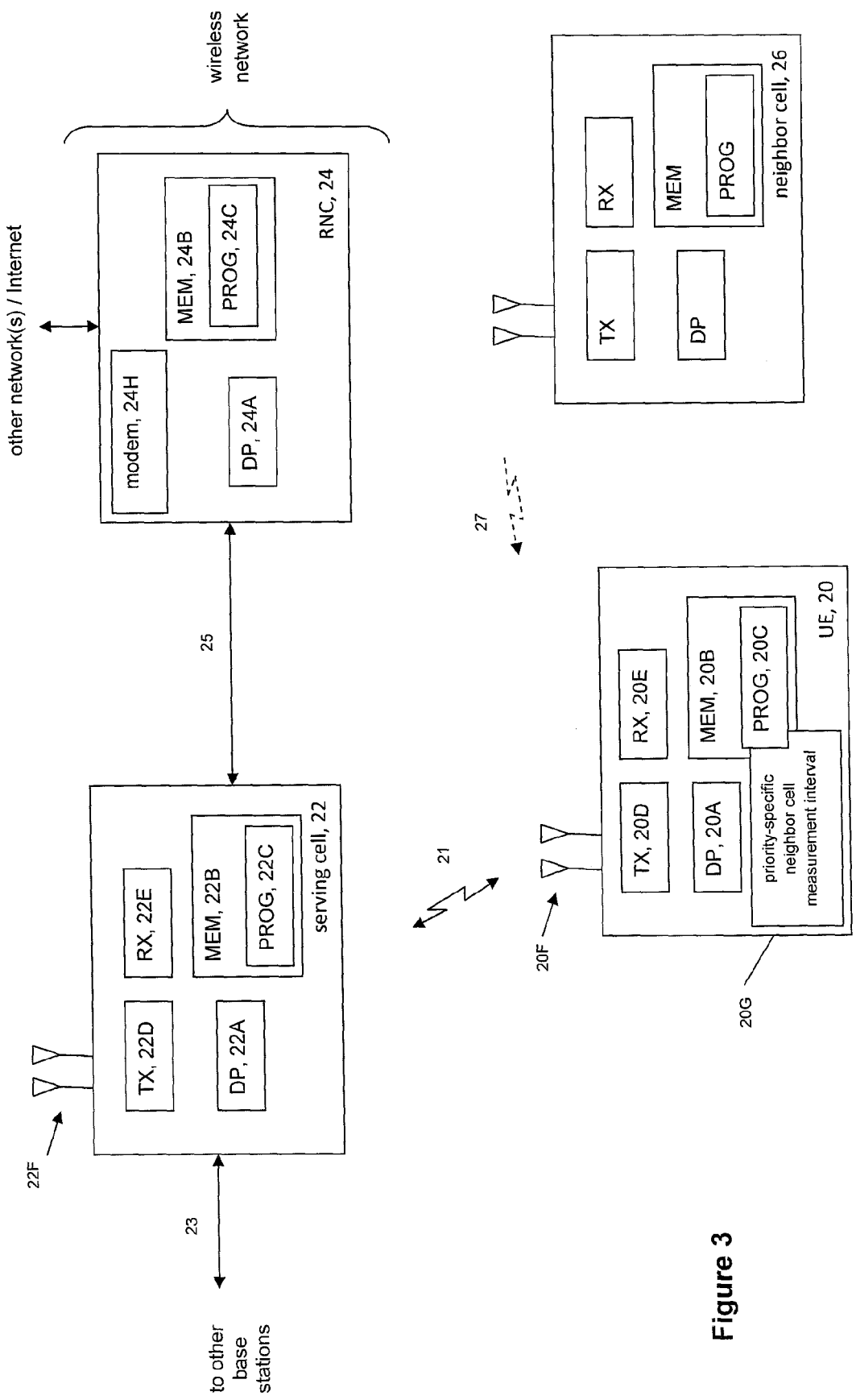
FIG. 3 is a simplified block diagram of the UE in communication with a UTRAN network and taking measurements of a neighbor E-UTRAN cell, and illustrating exemplary electronic devices suitable for use in practicing the exemplary embodiments of this invention.

Reference is now made to FIG. 3 for illustrating a simplified block diagram of various electronic devices and apparatus that are suitable for use in practicing the exemplary embodiments of this invention. In FIG. 3 a wireless network (base station 22 and RNC 24) is adapted for communication over a wireless link 21 with an apparatus, such as a mobile terminal or UE 20, via a network access node such as a base station/NodeB 22 or relay station. The network may include a radio network controller RNC 24, which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the base station 22 via one or more antennas 20F. Also stored in the MEM 20B at reference number 20G is the priority-specific neighbor cell measuring interval, which may be implemented by non-limiting example as a lookup table or as an algorithm. At least the processing means in combination with the storing means in which is stored the PROG of computer instructions may be considered a processing system.

The base station 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path 25 coupling the base station 22 with the RNC 24, and another data and/or control path 23 coupling the base station 22 to other base stations/node Bs/access nodes.

Similarly, the RNC 24 includes processing means such as at least one data processor (DP) 24A, storing means such as at least one computer-readable memory (MEM) 24B storing at least one computer program (PROG) 24C, and communicating means such as a modem 24H for bidirectional wireless communications with the base station 22 via the data/control path 25. While not particularly illustrated for the UE 20 or base station 22, those devices are also assumed to include as part of their wireless communicating means a modem which may be inbuilt on an RF front end chip within those devices 20, 22 and which also carries the TX 20D/22D and the RX 20E/22E.

Also shown is a neighbor cell 26 which similarly has a DP, MEM storing a PROG and transmitter, receiver and antennas. The neighbor cell 26 transmits on path 27 which the UE 20 measures according to the interval stored at 20G.

At least one of the PROGs 20C/20G in the UE 20 is assumed to include a set of computer readable instructions that, when executed by the associated DP 20A, enable the device to operate in accordance with the exemplary embodiments of this invention, as detailed above. In this regard the exemplary embodiments of this invention may be implemented at least in part by computer software instructions stored on the MEM 20B which are executable by the DP 20A of the UE 20, or by hardware, or by a combination of tangibly stored software and hardware (and tangibly stored firmware). Electronic devices implementing these aspects of the invention need not be the entire UE 20, but exemplary embodiments may be implemented by one or more components of same such as the above described tangibly stored software, hardware, firmware and DP, modem, system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the UTRAN and E-UTRAN systems, it should be appreciated that the exemplary embodiments of this invention are not limited for use with only this one particular type of wireless communication system, and that they may be used to advantage in other wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus for use in controlling a user equipment, the apparatus comprising:
   a processing system comprising at least one processor and a memory storing a set of computer instructions, in which the processing system is arranged to:
   determine that a neighbor cell is a higher priority cell than a serving cell;
   measure signal strength received from the neighbor cell in n iterations each spaced from one another by a time interval specific for the case in which the neighbor cell is the higher priority cell than the serving cell, in which n is an integer greater than one and the time interval is shorter than a corresponding interval for a different case in which the neighbor cell is assigned a priority which is not higher than the serving cell; and
   analyze the n measured signal strengths for reselecting a user equipment from the serving cell to the neighbor cell;
   wherein:
   the time interval comprises one discontinuous reception (DRX) period which the user equipment utilizes with the serving cell which is a UTRAN cell;
   the neighbor cell is a higher priority frequency layer cell or a higher priority radio access technology cell;
   the signal strength is measured across the n iterations while the user equipment is in one of a Cell-PCH state, URA-PCH state or idle mode with the UTRAN serving cell; and
   for a first one of the n iterations, the signal strength is measured during a first available measurement opportunity after the user equipment transitions to the said one of the Cell-PCH state, URA-PCH state or idle mode.

2. The apparatus according to claim 1, in which the processing system is further arranged to:
   reselect from the serving cell to the neighbor cell based on the analyzed n measured signal strengths without regard to signal quality of the serving cell.

3. The apparatus according to claim 1, in which processing system is further arranged to:
   reselect from the serving cell to the neighbor cell based on the analyzed n measured signal strengths without regard to whether a reselection condition remains satisfied for a specified time period $T_{reselection}$.

4. The apparatus according to claim 1, in which the processing system comprises a modem disposed within the user equipment.

5. A method of controlling a user equipment, comprising:
   determining that a neighbor cell is a higher priority cell than a serving cell;
   measuring signal strength received from the neighbor cell in n iterations each spaced from one another by a time interval specific for the case in which the neighbor cell is the higher priority cell than the serving cell, in which n is an integer greater than one and the time interval is shorter than a corresponding interval for a different case in which the neighbor cell is assigned a priority which is not higher than the serving cell; and
   analyzing the n measured signal strengths for reselecting the user equipment from the serving cell to the neighbor cell;
   wherein:
      the time interval comprises one discontinuous reception (DRX) period which the user equipment utilizes with the serving cell which is a UTRAN cell;
      the neighbor cell is a higher priority frequency layer cell or a higher priority radio access technology cell;
      the signal strength is measured across the n iterations while the user equipment is in one of a Cell-PCH state, URA-PCH state or idle mode with the UTRAN serving cell; and
      for a first one of the n iterations, the signal strength is measured during a first available measurement opportunity after the user equipment transitions to the said one of the Cell-PCH state, URA-PCH state or idle mode.

6. The method according to claim 5, further comprising:
   reselecting the user equipment from the serving cell to the neighbor cell based on the analyzed n measured signal strengths without regard to signal quality of the serving cell.

7. The method according to claim 5, further comprising:
   reselecting the user equipment from the serving cell to the neighbor cell based on the analyzed n measured signal strengths without regard to whether a reselection condition remains satisfied for a specified time period $T_{reselection}$.

8. The method according to claim 5, in which the method is executed by a modem disposed within the user equipment.

9. A non-transitory computer readable memory storing a set of instructions which, when executed by a user equipment, cause the user equipment to:
   determine that a neighbor cell is a higher priority cell than a serving cell;
   measure signal strength received from the neighbor cell in n iterations each spaced from one another by a time interval specific for the case in which the neighbor cell is the higher priority cell than the serving cell, in which n is an integer greater than one and the time interval is shorter than a corresponding interval for a different case in which the neighbor cell is assigned a priority which is not higher than the serving cell; and
   analyze the n measured signal strengths for reselecting the user equipment from the serving cell to the neighbor cell;
   wherein:
      the time interval comprises one discontinuous reception (DRX) period which the user equipment utilizes with the serving cell which is a UTRAN cell;
      the neighbor cell is a higher priority frequency layer cell or a higher priority radio access technology cell;
      the signal strength is measured across the n iterations while the user equipment is in one of a Cell-PCH state, URA-PCH state or idle mode with the UTRAN serving cell; and
      for a first one of the n iterations, the signal strength is measured during a first available measurement opportunity after transitioning to the said one of the Cell-PCH state, URA-PCH state or idle mode.

10. The non-transitory computer readable memory according to claim 9, in which the set of instructions, when executed, further cause the user equipment to:
   reselect the user equipment from the serving cell to the neighbor cell based on the analyzed n measured signal strengths either:
      without regard to signal quality of the serving cell; or
      without regard to whether a reselection condition remains satisfied for a specified timer period $T_{reselection}$.

* * * * *